(12) United States Patent
O'Mahony et al.

(10) Patent No.: US 10,783,043 B2
(45) Date of Patent: Sep. 22, 2020

(54) AUTOMATION AND OPTIMIZATION OF DATA RECOVERY AFTER A RANSOMWARE ATTACK

(71) Applicant: EMC IP Holding Company LLC, Hopkinton, MA (US)

(72) Inventors: Niamh O'Mahony, Blarney (IE); Andrew Byrne, Castlemartyr (IE); Regis Wenner, Ballincollig (IE); Celine Brandy, Cork (IE)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 136 days.

(21) Appl. No.: 16/035,270

(22) Filed: Jul. 13, 2018

(65) Prior Publication Data

US 2019/0286534 A1 Sep. 19, 2019

Related U.S. Application Data

(60) Provisional application No. 62/643,860, filed on Mar. 16, 2018.

(51) Int. Cl.
| | |
|---|---|
| *G06F 11/14* | (2006.01) |
| *G06F 21/56* | (2013.01) |
| *G06F 16/28* | (2019.01) |
| *G06N 20/00* | (2019.01) |

(52) U.S. Cl.
CPC ........ *G06F 11/1469* (2013.01); *G06F 16/285* (2019.01); *G06F 21/562* (2013.01); *G06F 21/565* (2013.01); *G06F 21/568* (2013.01); *G06N 20/00* (2019.01); *G06F 2201/805* (2013.01); *G06F 2201/82* (2013.01); *G06F 2221/034* (2013.01)

(58) Field of Classification Search
CPC ...... G06F 11/14; G06F 16/285; G06F 21/562; G06F 21/565; G06F 21/568; G06N 20/00
See application file for complete search history.

(56) References Cited

U.S. PATENT DOCUMENTS

| | | | | |
|---|---|---|---|---|
| 7,725,704 | B1* | 5/2010 | Beaverson | G06F 9/4401 713/1 |
| 9,009,542 | B1* | 4/2015 | Marr | G06F 11/3055 714/47.1 |
| 9,514,309 | B1* | 12/2016 | Mann | G06F 21/60 |
| 2011/0289584 | A1* | 11/2011 | Palagummi | G06F 21/562 726/24 |
| 2017/0177867 | A1* | 6/2017 | Crofton | G06F 21/566 |
| 2017/0374090 | A1* | 12/2017 | McGrew | H04L 12/4641 |
| 2018/0048658 | A1* | 2/2018 | Hittel | H04L 63/1433 |
| 2018/0203997 | A1* | 7/2018 | Charters | G06F 21/568 |
| 2018/0211039 | A1* | 7/2018 | Tamir | G06F 11/2053 |
| 2018/0212987 | A1* | 7/2018 | Tamir | H04L 63/1408 |
| 2019/0108340 | A1* | 4/2019 | Bedhapudi | G06F 21/566 |

(Continued)

*Primary Examiner* — Matthew M Kim
*Assistant Examiner* — Indranil Chowdhury
(74) *Attorney, Agent, or Firm* — Workman Nydegger

(57) ABSTRACT

In the face of ransomware attacks, which can be increasingly difficult to effectively prevent, a solution can be considered to be the minimization of the cost and time taken to recover data and, hence business activities. Embodiments perform a restore operation that include automatically identifying the most recent healthy backup, from which data should be restored, and the prioritizing of the order in which data should be restored.

17 Claims, 3 Drawing Sheets

(56) References Cited

U.S. PATENT DOCUMENTS

| | | | |
|---|---|---|---|
| 2019/0108341 A1* | 4/2019 | Bedhapudi | G06F 21/566 |
| 2019/0109870 A1* | 4/2019 | Bedhapudi | G06F 16/1734 |
| 2019/0138727 A1* | 5/2019 | Dontov | H04W 12/009 |
| 2019/0188380 A1* | 6/2019 | Animireddygari | G06F 11/1451 |
| 2019/0228148 A1* | 7/2019 | Pohl | G06F 3/0659 |
| 2019/0236274 A1* | 8/2019 | Brenner | G06F 11/1451 |
| 2019/0286533 A1* | 9/2019 | O'Mahony | G06N 20/00 |

\* cited by examiner

AUTOMATION AND OPTIMIZATION OF DATA RECOVERY AFTER A RANSOMWARE ATTACK

RELATED APPLICATIONS

This application claims the benefit of U.S. provisional application Ser. No. 62/643,860, filed Mar. 16, 2018, which application is incorporated herein by reference.

FIELD OF THE INVENTION

Embodiments of the present invention relate to systems and method for protecting data. More particularly, embodiments of the invention relate to systems and methods for restoring data after an attack such as a cyber-attack.

BACKGROUND

The increasing prevalence of cyber threats, in particular ransomware attacks, can impose significant overhead costs to businesses offering storage and recovery services. Cyber-threats also pose a serious threat to the businesses themselves or to the owner of the data. As data volumes continue to grow and the rate of growth increases, the cost to recover encrypted, or otherwise obfuscated, data becomes ever greater. Backup and recovery service providers and solution vendors need to minimize the impact to their business operations and that of their customers in the event of a ransomware attack or other cyber-attack. They can face many challenges, including the early detection of an infection on a client's machine or network in order to minimize the damage inflicted on customer data.

An effective solution in the event of a successful attack (e.g., a ransomware infection) is through the maintenance of regular backups and the implementation of a disaster recovery plan. The objective of these measures are to completely restore business operations. However, this solution is not without drawbacks. In spite of these recovery plans, the attack typically subjects the data owner to downtime while waiting for the recovery process to complete. Depending on the scale of the attack and the level of penetration through a filesystem, recovery can range from hours to days. This can be potentially devastating to the operations and reputation of a business servicing customers. In addition, owners are increasingly faced with the possibility that their backups are still infected. This complicates the restore process when considering that the restored data may still be infected or subject to loss or attack. Systems and methods are needed to better protect and restore data, particularly in the event of an attack that results in lost data or in an attack that affects backed up data.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the invention relate to systems and methods for protecting data. Embodiments of the invention further relate to systems and methods for restoring data that has experienced an attack and/or experienced data loss due to an event (e.g., virus, ransomware, or other cyber-attack).

Embodiments of the invention provide advantages and advances in at least two aspects of a data recovery process or a restore operation. First, embodiments of the invention identify a healthy backup from candidate backups. A healthy backup, by way of example, may be a backup that does not contain contaminated data (e.g., dormant malware) or an infection or is a backup that does not subject the restored data to attack after being restored. For example, some cyber-attacks result in files or data that are dormant for some period of time before becoming active. Thus, it is possible that the backups are also infected with the dormant data. Embodiments of the invention, however, are focused on identifying a healthy backup. Second, embodiments of the invention prioritize the recovery of data from the selected backup. For example, data that is commonly accessed or that is most recently used or worked on may be recovered first before recovering other data.

These improvements add value because they can reduce the effective downtime between the onset of the attack and the time at which they can resume their activities. Thus, the operation of the computing system is improved. Further, embodiments of the invention solve a technical issue—identifying and restoring healthy backups. Embodiments of the invention also address a computer-centric problem.

Figure 1:
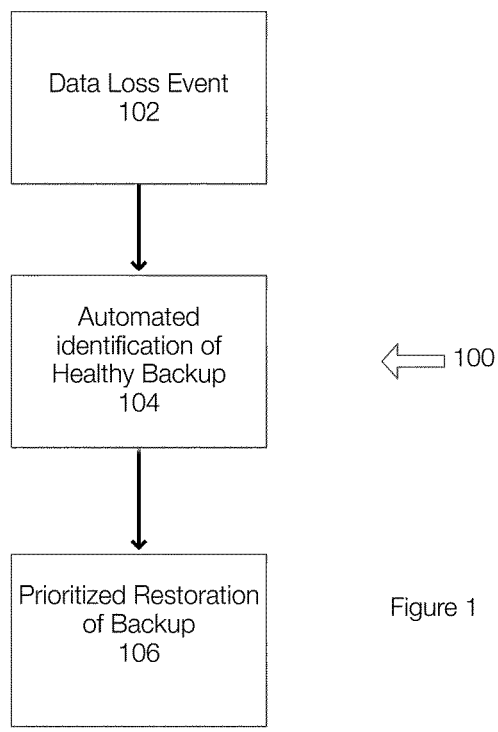
FIG. 1 illustrates an example of a method for restoring data in a system that experiences data lost due an attack or for other reason.

FIG. 1 illustrates an example of a method for restoring data or to a restore operation performed by a data protection system. In particular, FIG. 1 illustrates a method 100 for restoring data that has been lost or compromised as the result of a cyber-attack such as a ransomware attack. To restore data in these circumstances, the method 100 may identify a data loss event 102. Identifying the data loss event can be performed automatically by the data protection (or backup) application. Also or alternatively, the data protection application may communicate with security applications (e.g., antivirus, anti-malware, etc.) to detect that an attack has occurred or is occurring. Thus, the data protection application may receive input from a user or administrator indicating an attack or other data loss event has occurred or is occurring. In one example, preventative measures may be implemented when an attack is detected. For instance, the data protection operation may stop backing up data and prevent access to the backed up data or to the save sets when a data loss event occurs or is detected. A data loss event thus refers to data loss, a cyber-attack, a situation in which data is encrypted fully or partially, or the like. As used herein a data loss even may refer to a situation where the data has not been actually lost, but is encrypted an inaccessible (e.g., a ransomware attack).

After detecting a data loss event, a healthy backup is identified 104. Advantageously, the healthy backup can be identified automatically. As discussed herein, some of the factors used in identifying an appropriate backup may also be used in detecting the data loss event or in detecting the attack. It may be useful to identify the most recent healthy backup, although a client or administrator may have the ability to select a different healthy backup.

The identification of the most recent healthy backup can be critical for the effective recovery of data. Selecting a backup that is too old can result in unnecessary loss of healthy data for the client. Selecting a backup from after the attack began or from after the initial infection may result in the recovery of corrupted data and/or reinfection of recovered systems through the recovery of a dormant version of the malware that caused the attack.

Conventionally, the identification of the most recent healthy backup after a ransomware or similar attack includes having the customer themselves or a skilled technician manually investigate the candidate backups and, based on experience, choose a healthy backup. This is time-consuming and resource heavy. Further, this manual method relies on the availability of a technician to analyze the candidate backups. Finally, the speed and quality of the technician's decision can be subject to the individual technician's expertise and experience, and is likely influenced by the volume and frequency of the client's backups, which may determine the number of viable candidates.

Embodiments of the invention overcome these limitations by automatically identifying healthy backups 104 from candidate backups. After identifying and selecting a healthy backup candidate, embodiments of the invention may perform a prioritized restore operation 106.

When data is lost or corrupted, it can be vital for business continuity that the most critical data are restored with minimal latency. When a very large dataset has been affected by an attack, the entire recovery process may take many hours or even days. In such cases, the restore operation may prioritize critical data and then restore the critical data first. Further, the data can be prioritized in tiers or hierarchically. For example, once critical data is identified, the critical data may again be prioritized. Thus, critical data is selected for immediate recovery while the recovery of less critical data is performed later in the restore operation.

Currently, data is prioritized by having the owner of the data specify which data is critical either after the attack has occurred or through a pre-determined disaster recovery plan. Thus, critical files and directories may be restored manually, before launching a recovery of the less critical data. Unfortunately, this manual procedure is resource intensive, in the case of a large dataset from which critical files and directories must be found and selected, and is prone to error. For example, the person browsing through a backup for the critical files or directories may miss an important file or may unintentionally select the wrong file or set of files.

Furthermore, when working from this type of disaster recovery plan, the categorization of data criticality is often static and does not take into account the dynamic needs of a business at the particular point in time at which the attack has taken place. Nor does this type of plan account for newer data. For example, the end of a fiscal quarter may warrant that quarterly reports be restored first while, at the beginning of a fiscal quarter, these reports are less critical. Finally, even when the critical data have been identified in a conventional recovery plan, prioritization within that subset of data is typically not considered, meaning that the order of restoration may not be optimal for business.

In fact, backup service providers may advise customers to restore small sets of critical data before beginning the process of restoring all of their files or data, in order to improve business continuity, especially when the dataset for recovery is large and may take many hours or even days to be fully restored. This can be currently achieved by manual selection of urgently needed files by the customer. Such a method for prioritizing the restoration of data is cumbersome and is open to human error (e.g., if critical files are missed from the manual selection) as previously stated. Furthermore, conventional disaster recovery plans that determine which files will be selected for initial restoration are typically static, categorizing particular files or directories as "critical", "essential", "necessary", or "optional". However, in many businesses, the criticality of a given file or set of files may depend on the time of day or year, or the ongoing activities at the time of the data loss or corruption. In a dynamic business, where new datasets come on-stream as projects move through their life-cycle, the categorization of critical files may not always be up to date in a static disaster recovery plan.

Embodiments of the invention incorporate analytics into the restore operation. This allows critical data or files to be identified more accurately and more quickly. For example, the use of analytics allows those files which are most commonly and/or most recently accessed or modified to be identified. This may augment the disaster recovery plan with up-to-date dynamic priorities that can be applied to the entire data set. This is achieved through the definition of disaster recovery policies, which specify the criteria upon which to determine criticality of data, to replace or enhance file or directory based disaster recovery plans.

Embodiments of the invention may also prioritize the storage (e.g., type and/or device from tier 1—data center to tier 4—archived data) on which the data or backups are stored. More specifically, critical data may be stored or backed up at a higher or faster tier, which allows the critical data to be recovered more quickly.

When selecting a healthy backup and when prioritizing the data to be restored, embodiments of the invention may take previous restore operations into consideration or restorations of other systems into consideration. More generally, information regarding the data being restored or other datasets can be considered when selecting a backup and when prioritizing the data. This information may include data identified as critical, data used in responding to customers, data identified as infected, and the like. Usage patterns for these data sets, file change rates (e.g., read rates, write rates, save rates), insights from similar and/or simultaneous attacks affecting the data and the data of other clients may be used in identifying a healthy backup, ranking the candidate backups and/or in prioritizing the data.

Embodiments of the invention improve the process of data recovery after a data loss or data corruption event, including those events caused by malicious attack. Embodiments of the invention aim to improve the process in terms of at least two metrics: an increase in the speed of data recovery and a reduction in the human resource costs. These improve the operation of the computing system—in particular the data protection application and are directed to a computer-centric problem (cyber-attacks are computer based).

Figure 2:
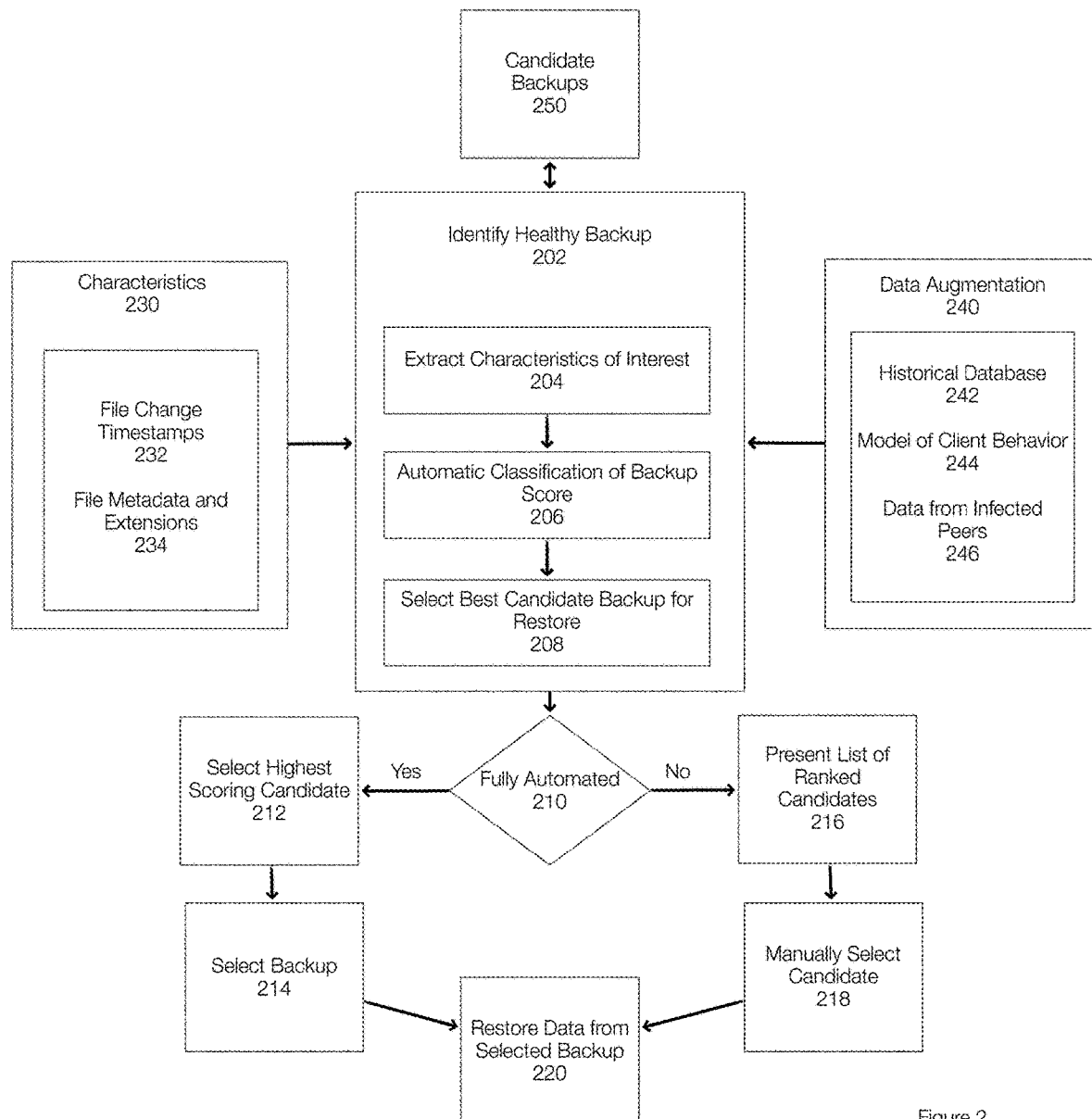
FIG. 2 illustrates an example of a method for restoring data and illustrates an example of a method for selecting a backup to use in a restore operation.
Figure 3:
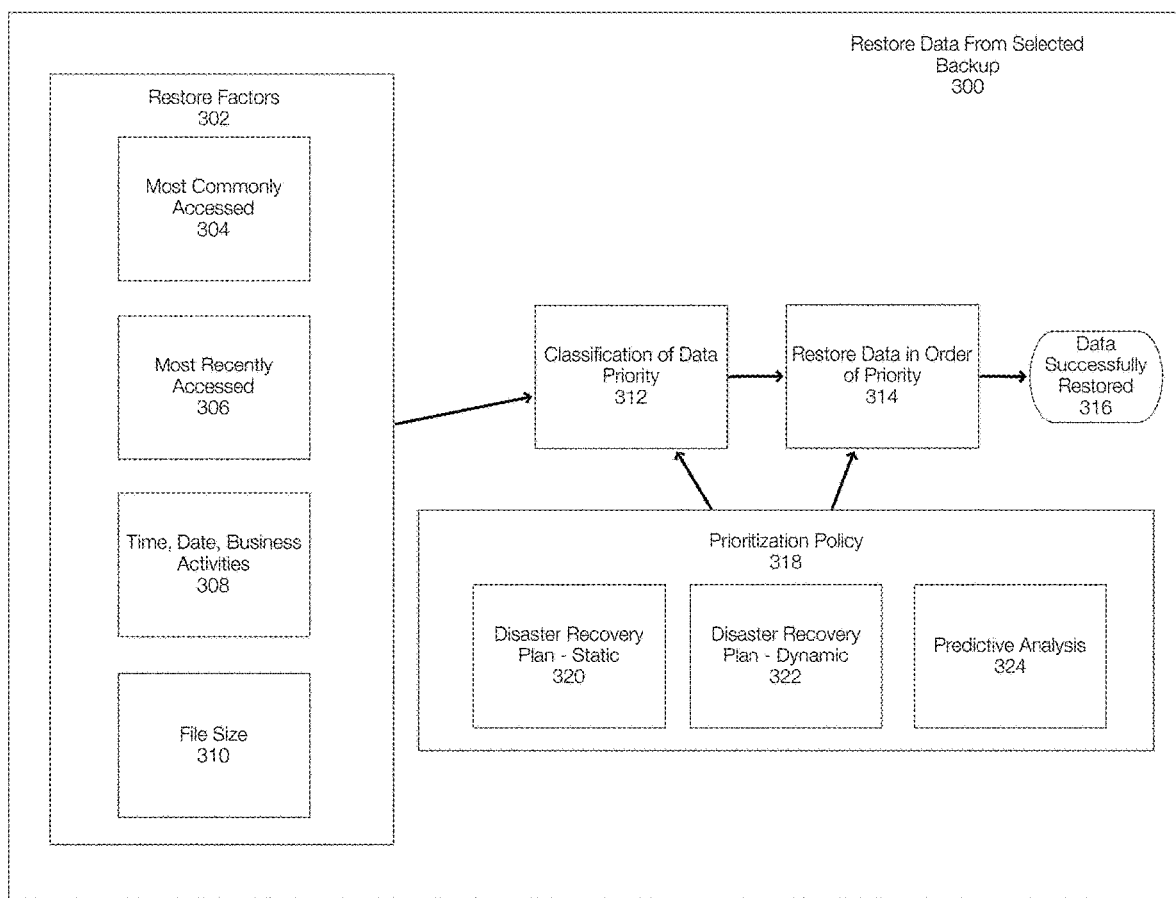
FIG. 3 illustrates an example of a method for restoring data and focuses on a method for prioritizing the order and manner in which data is restored from a selected backup.

FIGS. 2 and 3 illustrate examples of a restore operation. FIG. 2 illustrates the restore operation from the perspective of identifying a healthy backup from a set of candidate backups. FIG. 3 illustrates an example of the restoration operation from a data prioritization perspective.

The methods set forth in FIGS. 2 and 3 occur in the context of a computing environment or system, which may include client devices (desktops, laptops, tablets, phones, or the like), server computers, datacenters, or the like. Further, these operations may occur in virtual or non-virtual environments, cluster environments, cloud environments, or the like.

The backup application may be implemented on a server computer operating in a local network or in cloud based network. The backup system may include a backup server, agents operating on the backup server and/or on the clients and storage devices. The backup system may be an integrated device or implemented as distinct hardware components. Embodiments of the invention operate with real machines, virtual machines, cloud based applications, and the like.

FIG. 2 illustrates the selection of a candidate backup and the restoration of data from the selected candidate. Initially, a set of candidate backups 250 may be identified. The candidate backups 250 may correspond to the backups generated by and maintained by the backup system. These backups 250 constitute datasets and production data may be restored from one or more of the candidate backups 250. The candidate backups 250 may include full backups, incremental backups, snapshots, or the like.

The selection of a healthy backup from the candidate backups 250 may include extracting features of interest or characteristics from the backups 250. By way of example only, the characteristic or characteristics of interest 230 may include file change information 232 such as timestamps or other metadata. The characteristics or features 230 may include metadata such as author, time of last change, file size, location, last opened, last operation performed, timestamps, or the like. The characteristics 230 may also include file extensions.

In addition to these characteristics, the candidate backups may be mined to identify other features or characteristics. Some of the characteristics 230 may be gleaned from multiple backups (e.g., comparing a file or file metadata in one backup with a file or file metadata in another backup). The features of other unrelated datasets may also be considered (e.g., characteristics of datasets subject to a similar attack). Thus, the characteristics extracted from a peer dataset may be compared with the characteristics extracted from the candidate backups 250. Embodiments of the invention may have access to features that have been learned from events that occurred at other datasets. This could include filenames, file extensions, file locations, triggers, various change rates (write rates, name change or extension change rates) or the like.

Backup candidates 250 may be mined or analyzed to identify filename formats or file extensions that have been identified in a previous instance of an infection or similar infection. The backup application can be kept up-to-date with a library or access to these types of filenames or file extensions and other extracted features.

The candidate backups 250 may be mined or examined to identify how files have been modified or to identify a change in the rate at which files have been modified, and/or a time at which the changes were made. A change in any of these rates or a rate that is higher (or lower) than a threshold value may indicate an infection and may exclude a particular candidate backup from consideration. For example, if multiple files were accessed or changed at about the same time, an infection may be present. This analysis may also be considered in the context of whether the changes were expected and due to normal behavior (e.g., during normal business hours or legitimate business activities). This allows the rate of change to be categorized as normal or as a potential infection. Thus, features extracted from the candidate backups 250 can be viewed in the context of other features.

For example, if a set of files were changed at about the same time (e.g., within a predetermined time period), this may indicate that the backup is not healthy. If, at the same time, the change was to give the files the same file extension, this may further indicate an infection.

Data mining techniques can extract patterns and similar features from the backups such that the beginning of the infection can be accurately identified. For example, change rates associated with one backup may be compared with the same change rates of other backups. An outlier change rate or a change rate that is different may indicate that the corresponding backup is not healthy. The various rates of change may be applied to a single file or to multiple files. The various rates of change can be applied in the context of one backup or multiple backups.

Additional sources of information may be used when identifying a healthy backup. For example, models of normal behavior (rate of change, save rate, time of change, upload rate, etc.) can be derived from historical data or from the candidate backups. Often, this type of information is being generated as part of the backup protection system operation such that the information is available when an attack occurs. Other information may be obtained from other infected peers.

For example, the candidate backups 250 can be mined or analyzed to determine whether they are infected (e.g., detect the presence of malware or other signs of infection) or not using many different techniques. For example, the candidate backups 250 may be scanned in order to screen file extensions (.txt, .pdf, .mp4, etc.) against a group of file extensions that are indicators of infection (.locky, .vault, .locked, etc.). Often, this process is performed on the host storing the candidate backups 250 in order to reduce any latency impacts.

Another characteristic to measure or evaluate is the timestamps of the files in the candidate backup. A straightforward assessment would be to detect a high volume of files with the same (or within some time bound) time stamp. This would indicate an encryption engine iterating through the file system encrypting files. This characteristic can be independent of the file extension. This process can also be performed in the context of a directory or volume. If all or many of the files in a particular directory or volume were changed at about the same time, it may be indicative of an infection.

The rates at which files are changed can be compared to change rates from other infected datasets or with rates from other backups. This allows the characteristics of an unrelated dataset or a previous version of the dataset to be used in evaluating the candidate backups 250. Another characteristic is the unexpected presence of a file in a given location. A directory configured to store documents that includes an executable may be indicative of an infection. Variants from normal usage, normal storage patterns, or the like are indicative of infections.

The identification of a healthy backup from the candidate backups 250 may rely on characteristics or features of the backups and/or on data augmentation 204. As discussed herein, data augmentation 240 allows the process of identifying a healthy backup to be augmented with information that is useful in identifying infected data. Data augmentation 240 may include historical data such as a historical database 242, a model of client behavior 244, data from infected peers 246, or the like or combination thereof.

The historical database 242 may contain information such as change rates for files, which users or processes typically made changes to the files, typical file sizes, or the like. This information can be generated during the collection process so that it is ready available when needed. Alternatively, this information can be mined from the candidate backups.

For example, if the historical database indicates that a particular file or set of files are typically changed once a week, detecting that these files have been changed more quickly may indicate an infection. If a file is changed by a user that has never used the file or that does not normally use the file, this may indicate an infection. A change in the file size or a change that is more than a normal change may indicate an infection. For example, a file that experiences a size change of a megabyte when the historical changes were in the kilobyte range may be suspect.

A model of client behavior 244 may include information such as when changes to files are typically made, how often files are created, who or which process created a file, when particular processes or workflows operate, and the like. Changes in these features is indicative of infection.

Data from infected peers 246 may include the various types of information or features discussed herein, but from another system. For example, the rate of change of files in an infected peer system can be used to determine that a particular backup is infected if it has the same or similar rate of change or if the same files or sets of files are present in the backup. Thus, the features and information from peer systems can be used to identify infected backups.

These approaches could be supported with Machine Learning techniques with knowledge of a file systems' typical behavior patterns in order to reduce the risk of false positives. For example, the features to be tracked across the candidate backups may be identified. For example, the frequency of file changes measured by time stamps may be tracked across backups. Deltas measured between backup x-1 and x over successive backups provide a historical context on which a model of behavior can be build. This model is fed into a Machine Learning algorithm and used to detect, in the candidate backups, any significant divergence from the model. Information acquired from these comparisons can be added to the machine learning algorithm to improve the effectiveness thereof. Thus, models of behavior for any feature of interest can be developed and used as data augmentation 240.

In one example, the machine learning algorithms are data driven. Thus, these algorithms are able to make decisions in a data driven manner. Thus, providing the machine learning algorithm with data (e.g., the candidate backups and/or the extracted features or augmented data) allows patterns or other indicators to be identified. As more data is made available and consumed by the machine learning algorithms, the efficiency and predicting capability improves. For example, file change rates within a backup, with respect to two or more backups, or with respect to peer backups can be used to identify potentially infected backups. As more backups are processed, deviations or abnormal change rates, which are indicative of infections, can be more easily identified.

The characteristics 230 and augmentations 240 can be applied to specific backups and/or to multiple backups and/or to successive backups.

Using the analysis of the extracted features or characteristics 230 and the data augmentation 240, each of the candidate backups may scored or automatically classified. By analyzing the extracted features or characteristics 250, the candidate backups 250 can be ranked according to their likelihood of being the most recent healthy backup or according to their likelihood of being infected. For example, the backups may be ranked based on the number of features that indicate infection, the most healthy backup may be the backup that has the fewest features that indicate infection. This allows a balance to be achieved between retaining the most recent set of legitimate changes, while ensuring that all instances of the infection are eliminated or not present in a backup.

In one embodiment, machine learning classification is implemented to automatically analyze the extracted features and assign a score to each candidate backup. The score or ranking can also be performed based on deviations from the norm. For example, if the historical data indicates a certain change rate, a backup with a change rate that is higher than the change rates of other backups is given a poorer score or is more likely to be infected. In addition, the classifier or other component of the backup application can take the age of the backup into account in an objective function used to calculate the score and ranking, to ensure that the most recent healthy backup is identified.

Once the candidate backups have been scored or ranked, the best candidate backup from which a restore is performed is selected 208. The process of selecting the best candidate backup can be fully automated 210 or partially automated. When the selection is fully automated (YES at 210), the highest scoring candidate backup is identified 212 and selected 214. The data is then restored 220 using the selected backup.

If the selection is not fully automated (NO at 210), a list of ranked candidates may be presented 216 to a user (e.g., an administrator or technician). A candidate backup is then manually selected 218 from this list based on user input. The restore operation is then performed using the selected backup. Thus, once a score has been assigned to each candidate backup, the restore operation may select the backup from which data will be restored either (1) in a fully automated selection process, in which the candidate with the highest score is selected, or (2) based on a decision made by the technician and/or client, based on the outcome of the classification or ranking process. When the process is not fully automated, the client or administrator may not select the highest ranked candidate backup.

When identifying a healthy backup 202, the extracted features or characteristics of interest can be scored. In one example, the backup may be given an overall score or each data object can be scored independently and the overall score obtained from the individual scores. A score may range between, by way of example only, 0 to 100. Thus, a file whose extension is known to be malware may receive a score of 100. If the file is associated with a rate of change that is associated with malware or infection, the score of the rate of change may be 100. The manner in which the file complies with the historical database 242 or model of behavior can also result in a score. Thus, the backups can be scored and evaluated in this manner such that the best score (which may be the lowest or the highest) is deemed the best candidate.

FIG. 3 illustrates an example of a portion of a restore operation. In particular, FIG. 3 illustrates a portion of the restore operation that includes a prioritized restoration of the data. An automated and prioritized restore operation minimizes the disruption to the business activities caused by the infection by automatically restoring critical data first. The criticality of the data may be based on various factors.

Typically, the prioritization of data occurs after a healthy backup has been identified and selected. In FIG. 3, the process of identifying and selecting a backup has already occurred in the restore operation.

FIG. 3 illustrates that prioritizing data includes classifying of data priority 312 and may also include restoring the data in the order of priority 314. Classifying the data may rely on restore factors 302 and/or on prioritization policies 318. The prioritization policies 318 may include and/or build on static recovery plans 320. The prioritization policies 318 may include rules for building dynamic objective functions that will be used to classify data according to its "real-time" criticality (where the definition of "real-time" can be determined by the policy).

These policies 318 can define the objective functions used by machine learning classification algorithms. Thus, embodiments of the invention provide for a dynamic recovery plan 322. The inputs to the classification algorithms or to the dynamic recovery plan 322 may include the categorizations of the data from the static disaster recovery plans 320, as well as other real-time information, including, but not limited to, the most commonly accessed or modified data, the most recently accessed or modified data, the time of day/week/year and associated business activities (e.g. end-of-year financial reporting). Other relevant metadata, such as the size of a file, database or other data element, can also be fed into the dynamic recovery plan 322 and addressed in the objective function definition. For example, multiple files with equal or similar priority scores may be ordered by file size such that smaller files are recovered first. Predictive analysis 324 may also be used to determine the likelihood that a particular piece of data will be required before the entire data restoration process is complete. For example, it may be predicted that a given customer is likely to carry out a purchase, for which their previous transaction data may be required, and the priority score of those data are increased accordingly.

More specifically, the classification of data priority 312 relies on policies 318. The policies 318, as previously stated, may use factors 302 such as most commonly accessed files 304, most recently accessed filed 306, time, date, and business activities 308, and file size 310 to prioritize the data for restore. Classifying or categorizing the data may also rely on an existing recovery plan 320, a dynamic recovery plan 322 and predictive analysis 324.

After the automatic classification of priority for each piece of data, data restoration begins, with the highest priority data recovered first, and continues in order of decreasing priority until all data has been restored. The data can be prioritized in a granular manner. For example, the prioritization can be file based, directory based, or the like.

Embodiments of the invention thus contemplate the fusion of multiple data sources, including temporal information, patterns extracted from data mining techniques, historical client data, models of normal behavior, and features found to be relevant for infected peers, among others, to automatically classify candidate backups and allow better informed selection of the most recent healthy backup.

Embodiments of the invention contemplate the introduction of a disaster recovery policy, which defines objective functions for classifying the priority of data, based on multiple factors, such as real-time metrics relevant to the data and the business, at the time of the infection, which can allow a more intelligent approach to be taken to data recovery.

The inclusion of predictive analytics in the prioritization of data to be restored may help to minimize the disruption caused by the data loss event. Categorizing data or prioritizing data in a dynamic manner may ensure that a response to the data loss event is optimized according to the most critical business activities at the time of the event, rather than taking a global view of criticality, which may, on average, be effective, but may not be optimal at any given point in time.

Embodiments of the invention may also consider the impact of service level agreements (SLAs), for example for cloud service providers. The ability to reduce the time taken for the recovery of critical client data in the cloud can allow improved SLAs to be offered to cloud service clients, which will be more valuable for the service provider. Reducing the human resource cost associated with data recovery can also result in a financial gain for the cloud service provider.

During the prioritization aspect of a restore operation, the data may be classified in accordance with a predetermined recovery plan 320, although this could be omitted. The classification of data priority 312 can evaluate the data based on data most commonly accessed or most recently accessed. This information may be stored as metadata with the candidate backups or derived from examining timestamps and other file metadata. The data can also be classified based on size or time, date, or business activities. The restore factors 302 could also be applied to categories associated with the static recovery plan 320. For example, all files marked as critical in the plan 320 can be priorities based on the factors 302.

Thus, each data or file is given a score based on the most recent access. For example, each file may receive a score for when the file was accessed, how often the file is accessed, the time, the date, current business activities, file size, likelihood that the file will be needed soon (predictive analysis) and the like. These scores can be combined into a final score. The scores of all files can then be used to determine which files are restored first.

Assuming, by way of example only, that prioritization is based on scores, each factor may account for a certain portion of the overall potential score. If there are 6 factors and each factor is worth 3 points, a score of 18 results in the highest priority. Of course, each factor could account for 100 points or be used in another manner.

For example, when classifying the data or the data objects included in the production data of a healthy backup, the data objects may each be given a score as previously stated. If each factor is worth 3 points, with regard to most commonly accessed 304, data objects or files accessed within a first time period may be given a score of 3, data objects in a second time period later than the first period may be given a score of 2. Scores of 1 and 0 may be assigned to later time periods.

With regard to most recently accessed, a similar scheme could be applied. Objects accessed in a recent first time period may receive a score of 3, which data objects accessed in second, third, etc., time periods may receive scores of 2, 1, etc.

Time, date and business activities can also be scored. If the date is the end of quarter, then data objects needed at the end of the quarter may receive a score of 3.

Thus, data objects can be given relative scores. The scores can be combined for an overall priority score. For example, a data object that was recently accessed (3 points), not commonly accessed (score 1) and needed for a current business activity or date (3) receives a score of 7. A second data object that scored 3 in all of these factors may receive a score of 9. Thus, the second data object is restored first. Instead of scores, categories could also be used (e.g., critical, urgent, normal, not urgent). Data objects in the same category or having the same score are restored before objects of a lower category.

These methods could also be combined. For example, all files deemed critical can be scored individually such that there is a prioritization within each category.

These factors can also be combined with prioritization policies. For example, a static plan may have already associated a score or category. This category or score can be changed based on the factor. For example, if an end of quarter document is deemed critical or has a score of 9 out of 9 but the time or business activity does not require a quarterly document, the score may be reduced or the category changed by some amount. Thus, the dynamic policy 322 can adapt the static plan 320 and may incorporate the factors 302 when adapting. Similarly, the predictive analysis 324 can be used to change a score. A data object with a low score or category (e.g., normal) may be changed to critical if the data object is expected to be needed within a certain time period.

Enterprise customers with non-cloud-based data recovery solutions, such as isolated recovery products, can benefit from the automation of the data recovery process after a data loss event, through a reduced requirement for highly skilled and experienced technicians to make decisions about backup selection and data restoration order, and a reduction in the duration of the disruption to business activities caused by the event.

It should be appreciated that the present invention can be implemented in numerous ways, including as a process, an apparatus, a system, a device, a method, or a computer readable medium such as a computer readable storage medium or a computer network wherein computer program instructions are sent over optical or electronic communication links. Applications may take the form of software executing on a general purpose computer or be hardwired or hard coded in hardware. In this specification, these implementations, or any other form that the invention may take, may be referred to as techniques. In general, the order of the steps of disclosed processes may be altered within the scope of the invention.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or target virtual machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for performing a restore operation, the method comprising:
   identifying a healthy backup from a plurality of candidate backups from which to restore production data in a computing system that has experienced an event;
   classifying the production data included in the healthy backup such that the production data is ordered with a priority, wherein the priority is based on a plurality of factors;
   performing the restore operation by restoring the production data from the identified healthy backup in accordance with the priority.

2. The method of claim 1, further comprising classifying the production data based on data that is most commonly accessed, wherein the most commonly accessed data has a higher priority than data that is less commonly accessed.

3. The method of claim 1, further comprising classifying the production data based on data that is most recently accessed, wherein the most recently accessed data has a higher priority than data that is less recently accessed.

4. The method of claim 1, further comprising classifying the production data based on file size.

5. The method of claim 1 further comprising classifying the production data based on time of year or business activities.

6. The method of claim 1, wherein the plurality of factors include most commonly accessed, most recently accessed, file size, time, date and business activities.

7. The method of claim 1, further comprising, classifying the data based on at least one prioritization policy, the at least one prioritization policy including a static recovery plan, a dynamic recovery plan, and predictive analysis.

8. The method of claim 7, wherein the predictive analysis results in data that is expected to be used in a time period receiving a priority higher than data that is not expected to be used within the time period.

9. The method of claim 8, wherein the static recovery plan includes a preliminary prioritization, wherein the preliminary prioritization is adapted based on the factors.

10. The method of claim 8, wherein the dynamic recovery plan adapts the factors or the static recovery plan.

11. A method for performing a restore operation, the method comprising:
   determining that an event has occurred in a computing system that includes production data, wherein a plurality of candidate backups are available to the computing system such that the production data can be restored;
   identifying a healthy backup from the plurality of candidate backups by:
   prioritizing the production data included in the healthy backup such that the production data is restored in an order of priority, wherein the priority of a plurality of data objects included in the production data is based on a plurality of restore factors and at least one prioritization policy; and
   restoring the production data from the selected healthy backup.

12. The method of claim 11, wherein the plurality of factors include most commonly accessed, most recently accessed, file size, time, date and business activities.

13. The method of claim 12, wherein each data object in the healthy backup is assigned a score based on the plurality of factors, each factor contributing to the score, wherein the data objects having the highest score have the highest priority and are restored first.

14. The method of claim 13, further comprising assigning a score for each factor to each of the data objects.

15. The method of claim 11, further comprising, wherein the at least one prioritization policy includes a static recovery plan, a dynamic recovery plan, and predictive analysis.

16. The method of claim 15, wherein the predictive analysis results in data that is expected to be used in a time period receiving a priority higher than data that is not expected to be used within the time period.

17. The method of claim 15, wherein the static recovery plan includes a preliminary prioritization, wherein the preliminary prioritization is adapted based on the plurality of factors.

* * * * *